(12) United States Patent
Berrett et al.

(10) Patent No.: US 9,176,214 B2
(45) Date of Patent: Nov. 3, 2015

(54) PROXIMITY DETECTION FOR SHARED COMPUTING EXPERIENCES

(75) Inventors: Doug Berrett, Seattle, WA (US); Mike Albee, Redmond, WA (US); Cory Cirrincione, Bellevue, WA (US); Sean Kollenkark, Seattle, WA (US); Joseph McClanahan, Redmond, WA (US); Michael Patten, Sammamish, WA (US); Christopher Weare, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 247 days.

(21) Appl. No.: 13/207,299

(22) Filed: Aug. 10, 2011

(65) Prior Publication Data

US 2013/0040572 A1    Feb. 14, 2013

(51) Int. Cl.
 *H04B 7/00* (2006.01)
 *G01S 5/00* (2006.01)
 (Continued)

(52) U.S. Cl.
 CPC ............... *G01S 5/0072* (2013.01); *A63F 13/10* (2013.01); *A63F 13/12* (2013.01); *H04W 4/023* (2013.01); *A63F 2300/204* (2013.01); *A63F 2300/404* (2013.01); *A63F 2300/5573* (2013.01); *A63F 2300/6063* (2013.01); *H04W 76/02* (2013.01)

(58) Field of Classification Search
 CPC .......... H04B 5/02; H04B 5/0012; H04B 5/00; H04W 88/06; H04W 76/02; H04W 8/005; H04M 2250/02; G06F 1/1613
 USPC ................ 455/41.1, 41, 2, 41.3, 414.1, 552.1
 See application file for complete search history.

(56) References Cited

U.S. PATENT DOCUMENTS 6,542,436 B1    4/2003 Myllyla
7,653,883 B2    1/2010 Hotelling et al.
(Continued)

FOREIGN PATENT DOCUMENTS

WO    2010/062617 A1    6/2010

OTHER PUBLICATIONS

Krumm, et al., "The NearMe Wireless Proximity Server", Retrieved at <<http://citeseerx.ist.psu.edu/viewdoc/download;jsessionid=6C978DEA6FA8AE78539325CDDB7C9074?doi=10.1.1.63.6534&rep=rep1&type=pdf>>, In the Proceedings of Sixth International Conference on Ubiquitous Computing, Sep. 7-10, 2004, pp. 283-300.

(Continued)

*Primary Examiner* — Wesley Kim
*Assistant Examiner* — Md Talukder
(74) *Attorney, Agent, or Firm* — Judy Yee; Micky Minhas (57) ABSTRACT

Systems and methods for detecting whether or not two devices are proximate to one another in order to provide a shared computing experience are provided. The method includes broadcasting audio from a first computing device; receiving the broadcast audio at a second computing device; and processing the received audio to identify a unique audio signature within the broadcasted/received audio. The unique audio signature uniquely identifying the first computing device. The method may further include determining that the first computing device and the second computing device are proximate to one another based on the broadcast audio; and providing a shared computing experience at one or both of the first computing device and the second computing device, where the shared computing experience is not provided in the event that it is determined that the first and second computing devices are non-proximate to one another.

19 Claims, 6 Drawing Sheets

(51) Int. Cl.
*H04W 4/02* (2009.01)
*A63F 13/40* (2014.01)
*A63F 13/30* (2014.01)
*H04W 76/02* (2009.01)

(56) References Cited

U.S. PATENT DOCUMENTS

| | | |
|---|---|---|
| 7,769,894 B2 | 8/2010 | Matz |
| 7,796,946 B2* | 9/2010 | Eisenbach .................... 455/41.2 |
| 8,727,885 B2* | 5/2014 | Berger et al. .................... 463/42 |
| 2004/0068744 A1* | 4/2004 | Claussen et al. ................ 725/81 |
| 2004/0215756 A1* | 10/2004 | VanAntwerp et al. ........ 709/223 |
| 2008/0003985 A1* | 1/2008 | Jung et al. .................. 455/414.1 |
| 2008/0102891 A1* | 5/2008 | Nettamo et al. .............. 455/557 |
| 2008/0113665 A1* | 5/2008 | Paas et al. .................. 455/426.1 |
| 2008/0207322 A1* | 8/2008 | Mizrahi .......................... 463/32 |
| 2008/0263235 A1* | 10/2008 | Hans et al. ...................... 710/22 |
| 2009/0143056 A1* | 6/2009 | Tang et al. .................... 455/418 |
| 2009/0265470 A1* | 10/2009 | Shen et al. .................... 709/227 |
| 2010/0056174 A1 | 3/2010 | Goldberg et al. |
| 2010/0082784 A1* | 4/2010 | Rosenblatt et al. ........... 709/222 |
| 2010/0198972 A1 | 8/2010 | Umbehocker |
| 2010/0278345 A1* | 11/2010 | Alsina et al. .................. 380/283 |
| 2010/0279768 A1* | 11/2010 | Huang et al. .................... 463/31 |
| 2011/0307599 A1* | 12/2011 | Saretto et al. ................. 709/224 |
| 2011/0314153 A1* | 12/2011 | Bathiche et al. .............. 709/225 |
| 2012/0009997 A1* | 1/2012 | Youm .............................. 463/42 |
| 2012/0045994 A1* | 2/2012 | Koh et al. ..................... 455/41.3 |
| 2012/0062758 A1* | 3/2012 | Devine et al. ............... 348/222.1 |
| 2012/0077586 A1* | 3/2012 | Pishevar ........................ 463/31 |
| 2012/0122552 A1* | 5/2012 | Youm ............................. 463/23 |
| 2012/0122588 A1* | 5/2012 | Berger et al. ................... 463/42 |
| 2012/0184373 A1* | 7/2012 | Kim et al. ...................... 463/42 |
| 2012/0202514 A1* | 8/2012 | Kadirkamanathan et al. .......................... 455/456.1 |
| 2012/0214544 A1* | 8/2012 | Shivappa et al. ........... 455/556.1 |
| 2012/0263154 A1* | 10/2012 | Blanchflower et al. ....... 370/338 |
| 2012/0265328 A1* | 10/2012 | Kadirkamanathan et al. .. 700/94 |
| 2012/0272156 A1* | 10/2012 | Kerger et al. ................. 715/747 |
| 2012/0278825 A1* | 11/2012 | Tran et al. ....................... 725/13 |
| 2012/0287022 A1* | 11/2012 | Queen ............................ 345/2.1 |
| 2012/0290648 A1* | 11/2012 | Sharkey ........................ 709/204 |
| 2012/0290653 A1* | 11/2012 | Sharkey ........................ 709/204 |
| 2012/0311504 A1* | 12/2012 | van Os et al. ................. 715/853 |
| 2012/0315994 A1* | 12/2012 | Huang et al. .................... 463/42 |
| 2013/0040572 A1* | 2/2013 | Berrett et al. ................. 455/41.2 |
| 2013/0073064 A1* | 3/2013 | Houvener et al. ............... 700/91 |
| 2013/0231054 A1* | 9/2013 | Fry ............................... 455/41.2 |
| 2013/0265857 A1* | 10/2013 | Foulds et al. .................. 367/199 |

OTHER PUBLICATIONS

Treu, et al., "Efficient Proximity Detection for Location Based Services", Retrieved at <<http://www.wpnc.net/fileadmin/WPNC05/Proceedings/Efficient_Proximity_Detection_for_Location_Based_Services.pdf>>, Proceedings of the 2nd Workshop on Positioning, Navigation and Communication & 1st Ultra-Wideband Expert Talk, 2005, pp. 15-173.

Holmquist, et al., "Supporting Group Collaboration with Inter-Personal Awareness Devices", Retrieved at <<http://citeseerx.ist.psu.edu/viewdoc/download?doi=10.1.1.35.8839&rep=rep1&type=pdf>>, Journal of Personal Technologies, 1999, pp. 105-124.

Li, et al., "PeopleTones: A System for the Detection and Notification of Buddy Proximity on Mobile Phones", Retrieved at <<http://timothysohn.com/pdf/peopletones-mobisys2008.pdf>>, In the Proceeding of the 6th international conference on Mobile systems, applications, and services Jun. 17-20, 2008, pp. 14.

"International Search Report", Mail Date: Feb. 8, 2013, Application No. PCT/US2012/048361, Filed date: Jul. 26, 2012, pp. 9.

European Patent Office, Supplementary Search Report Issued in European Patent Application No. 12822895.4, Mailed Date: May 26, 2014, Germany, 3 Pages.

European Patent Office, Office Action Issued in European Patent Application No. 12822895.4, Jul. 1, 2014, Netherlands, 5 Pages.

The State Intellectual Property Office of China, First Office Action and Search Report received for Chinese Patent Application No. 201280039091.9, Jul. 30, 2015, China, 14 Pages.

* cited by examiner

PROXIMITY DETECTION FOR SHARED COMPUTING EXPERIENCES

BACKGROUND

In computer games and other electronic settings, it is now commonplace to configure software experiences to provide for multi-device interaction. This can occur when devices are proximate to one another (e.g., in the same room), or where users are remotely located from each other. In the case of multi-device interaction, the shared experience is not varied based on whether the devices are proximate or remote. Also, it typically is required that the game or other software application be affirmatively and explicitly configured to account for the fact of multiple users, and to specifically identify that certain users will participate in the interactive software experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Systems and methods for detecting whether or not two devices are proximate to one another in order to provide a shared computing experience are provided. The method includes broadcasting audio from a first computing device; receiving the broadcast audio at a second computing device; and processing the received audio to identify a unique audio signature within the broadcasted/received audio. The unique audio signature uniquely identifies the first computing device. The method may further include determining that the first computing device and the second computing device are proximate to one another based on the broadcast audio; and providing a shared computing experience at one or both of the first computing device and the second computing device, where the shared computing experience is not provided in the event that it is determined that the first and second computing devices are non-proximate to one another.

DETAILED DESCRIPTION

Figure 1:
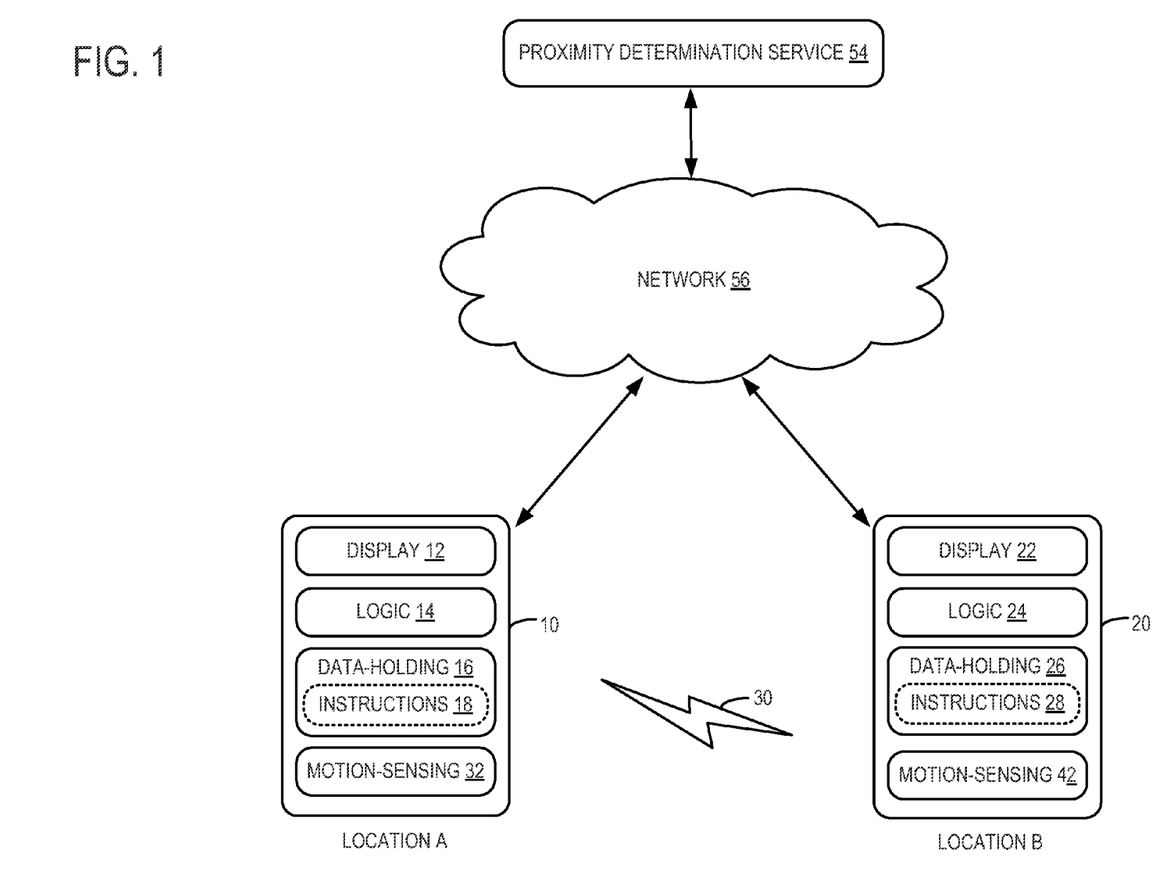
FIG. 1 shows an exemplary setting in which computing systems can participate in an interactive computing experience.

FIG. 1 depicts an exemplary setting in which multiple computing systems can participate in an interactive video game or other interactive computing experience. Two computing systems are depicted (computing system 10 and computing system 20), though it will be appreciated that the present systems and methods may be employed in connection with any other number of distinct computing systems.

Computing system 10 may be in Location A and computing system 20 may be in Location B. Depending on the proximity of the two locations, computing system 10 and computing system 20 may participate in an interactive experience, also referred to herein as a shared experience. In other words, the two computing systems may be near enough to consume each other's content, as described in more detail below.

In some embodiments, the computing systems may be communicatively linked to the same network. For example, the computing systems may be on the same local area network (LAN). Further, the computing systems may be configured for wireless communication. For example, the computing systems may be communicatively enabled for Wi-Fi, and therefore the two computing systems may wirelessly communicate with each other (indicated generally at 30). In other examples, the computing systems may be hard-wired to the same network. Computing system 10 may determine that computing system 20 is in close proximity since the two computing systems are communicatively linked to the same network. In this way, computing device 10 and computing device 20 may be in proximate locations (i.e., Location A is substantially close to Location B), and further, the computing systems may be configured to interact through a shared experience due to the close proximity. An example method for determining if two or more computing systems connected to the same network are proximate is discussed below with respect to FIG. 4.

It will be appreciated that while the above scenario is described such that computing system 10 determines if computing system 20 is in close proximity, the reverse may also be possible. For example, computing system 20 may determine that computing system 10 is in close proximity since the two computing systems are communicatively linked to the same network.

In some embodiments, computing system 10 may determine that computing system 20 is proximate via a cloud computing service. For example, computing system 10 and computing system 20 may be communicatively linked to a proximity determination service 54 via network 56. The proximity determination service 54 may be configured to detect the proximity of computing system 10 and computing system 20 when the two computing systems are communicatively linked to different local area networks, for example. As such, proximity determination service 54 may initiate proximity determination between two or more devices. In another example, one or more devices may initiate proximity determination with another device via proximity determination service 54. In other words, proximity determination service 54 may manage proximity determination when prompted by a computing system. Regardless of the initiator, computing device 10 and computing device 20 may be determined to be in proximate locations (i.e., Location A is substantially close to Location B), and further, the computing systems may be configured to interact through a shared experience even when the two computing systems are communicatively linked to different networks. An example method for determining if two or more computing systems connected to different networks are proximate is discussed below with respect to FIGS. 5 and 6.

Figure 2:
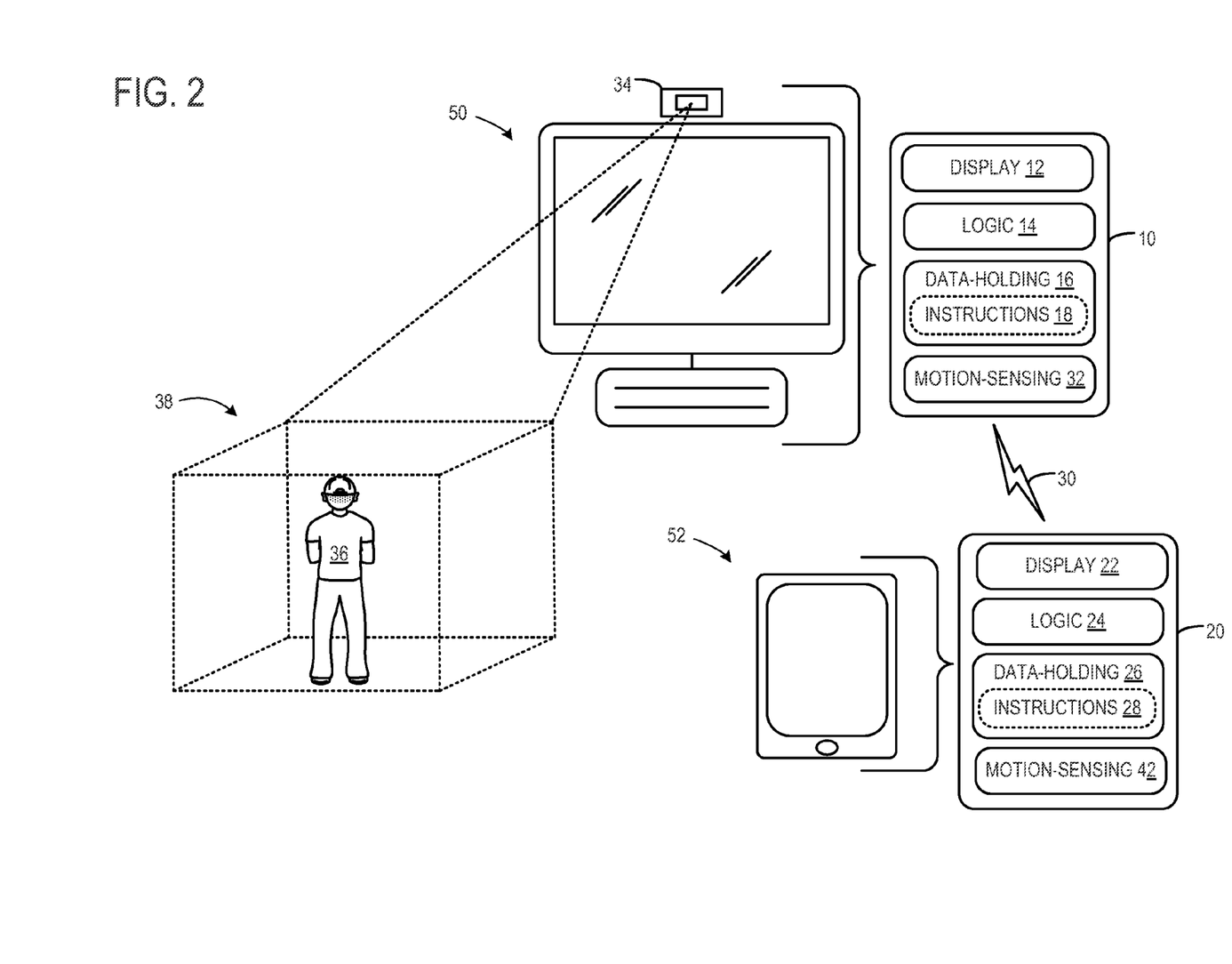
FIG. 2 shows an exemplary setting in which users of separate computing devices can interact in connection with a shared hardware- and software-enabled computing experience.

As shown, each computing system includes a display subsystem (subsystems 12 and 22); a logic subsystem (subsystems 14 and 24); and a data-holding subsystem (subsystems 16 and 26) which may contain instructions (18 and 28) that are executable by a logic subsystem, e.g., processors of logic subsystems 14 and/or 24. From this, it should be apparent that the computing systems each have display, processing and storage/memory features. In addition, each system may have or employ a variety of other input/output elements, and typically will include communication subsystems that enable communication over a variety or wireless and/or wired links (e.g., link 30).

Instructions 18 and 28 may be configured to determine proximity of one computing device to another computing device. The instructions may enable the computing device to broadcast content (e.g., an invitation) to join a proximate shared computing experience. Further, the instructions may enable the computing device to receive said invitation from another computing device. Further still, the instructions may enable the computing device to determine if it is proximate to another computing device based upon the received content, as described in more detail below. It will be appreciated that these instructions may be employed in connection with a proximity module, which may be a component of the computing device and/or a remote server, for example.

In addition, as best shown in FIG. 2, each of the interacting computing systems may include a motion subsystem (motion subsystems 32 and 42) capable of observing motion of a target object and, in response, interpreting the motion into commands used to control a connected computing system. More specifically, the figure shows a depth camera 34 capable of tracking motion and position of a human target 36 within capture volume 38. In one example, tracked motions are processed to yield associated changes in a 3D spatial model of the human target, e.g., as contained within data-holding subsystem 16 or 26. User motion and corresponding changes in the model are then used to control the connected computing system. For example, in a first-person virtual reality game, tracked motion of the human user can be used to move the "virtual user" through the virtual reality environment. As described in more detail below, depth camera 34 may be configured for motion capture and may be additionally configured for proximity detection. For example, depth camera 32 may be configured to receive a broadcasted video signature sent from another device.

Many systems exist in which two or more computing devices interact, for example in a multi-player online video game. However, these systems typically require explicit manual actions to log in users or to otherwise specify that the software will be executed for multiple users, and to identify the specific users and devices that will be involved. Moreover, these systems do not provide different experiences based on device location. Specifically, the experience that occurs at each participating device does not change based on whether the devices are in the same room or located remote from one another.

Figure 3:
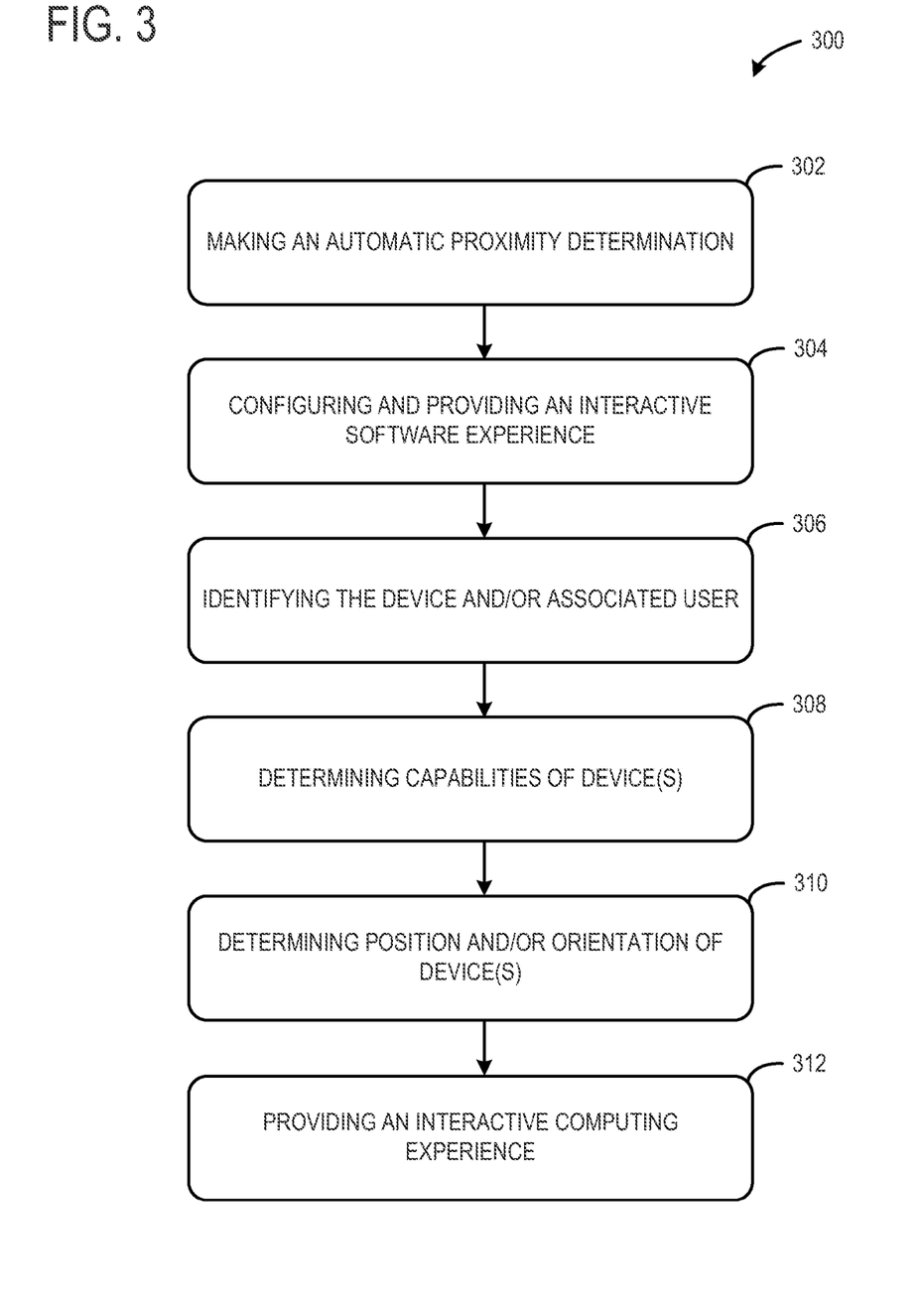
FIG. 3 depicts an exemplary method for configuring software experiences in response to automatic proximity determinations.

Accordingly, FIG. 3 depicts an exemplary method 300 for automatically configuring and executing a computing experience in which multiple different devices interact. At the highest level, the method includes making an automatic proximity determination, as shown at 302. Then an interactive software experience is configured and provided (step 304) based on the result of the automatic proximity determination. The experience is proximity-affected in the sense that the experience is different depending on whether two or more of the devices are proximate to one another (e.g., within the same room). For example, a computer game could provide a different experience if it is detected that two devices are in the same room.

For one or more devices (e.g., devices that have been determined to be proximate to one another), the method may further include identifying the device and/or associated user (step 306); determining capabilities of device(s) (step 308); and/or determining position and/or orientation of the device(s) (310). Accordingly, when all of the steps are performed, (1) the system may have determined that two or more devices are proximate to one another; (2) the specific devices or associated users are identified; (3) device capabilities are known by the system; (4) the position and/or orientation of the device(s) are known by the system. Accordingly, the method may further include, at 312, providing an interactive computing experience that is further affected by any of the determinations occurring at steps 306, 308 and 310.

Figure 4:
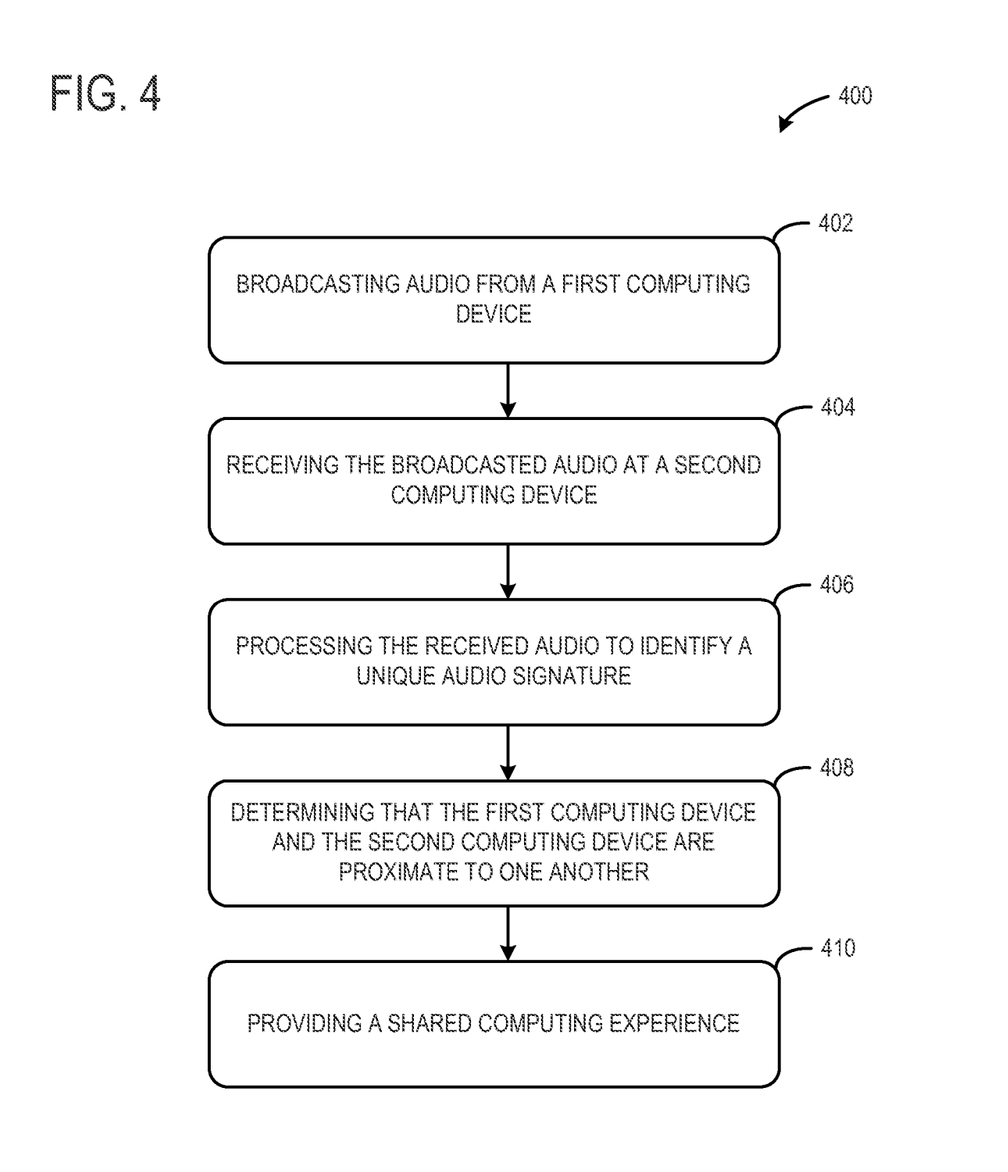
FIGS. 4-6 depict exemplary methods for determining whether computing devices are proximate to one another.
Figure 5:
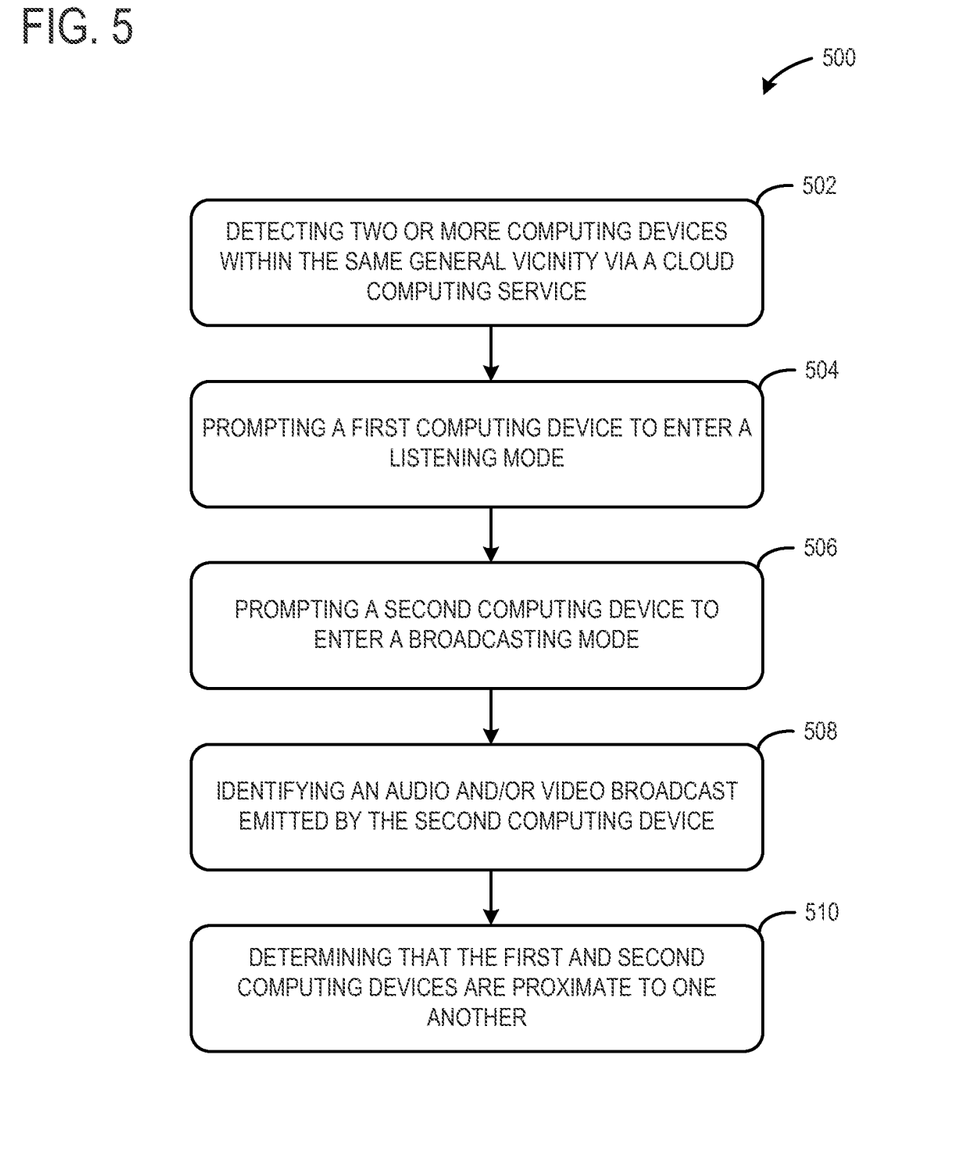
Figure 6:
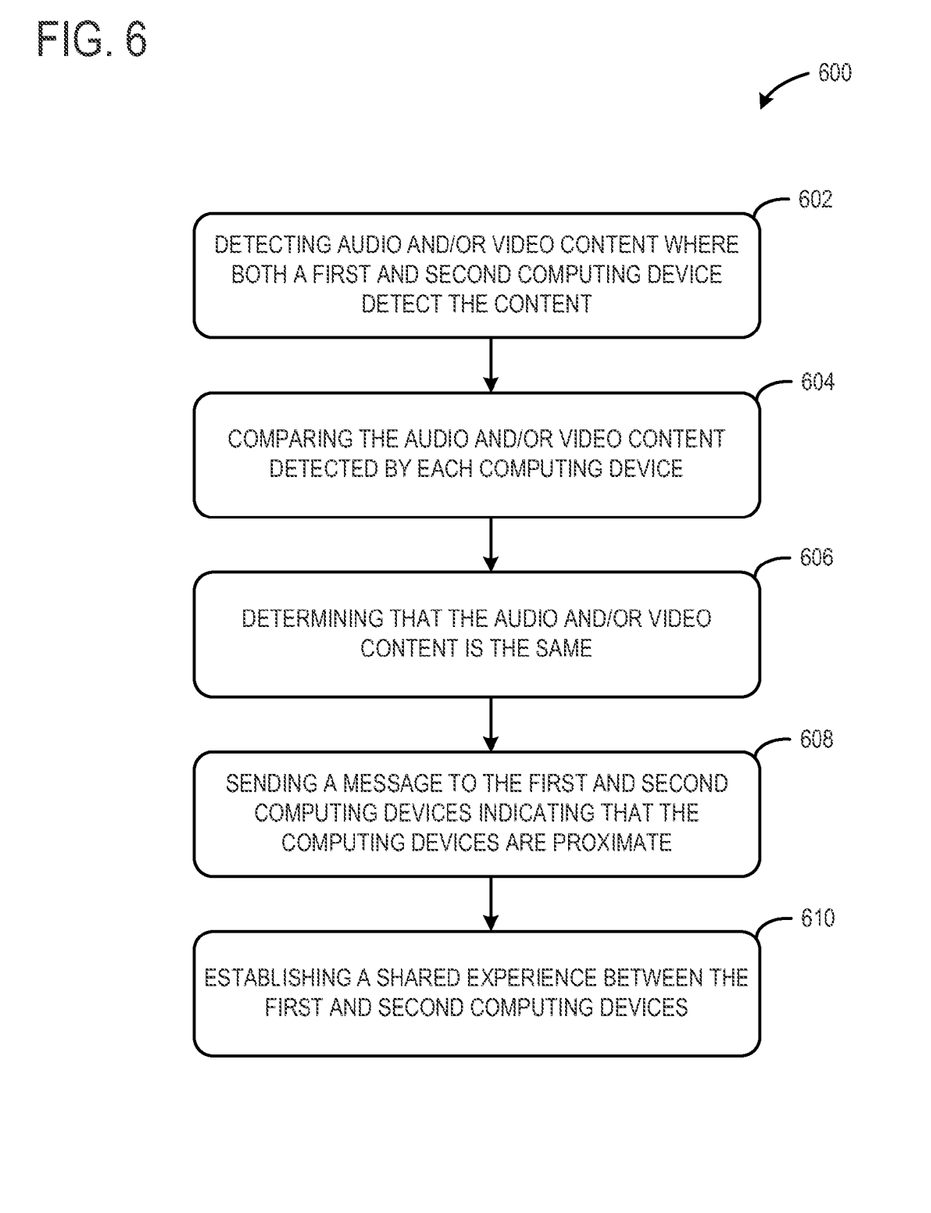

FIGS. 4-6 illustrated example methods for determining if two or more computing devices are in close proximity. For example, the example methods shown in FIGS. 4-6 may be implemented in order to make an automatic proximity determination. In other words, one or more of the following example methods may be implemented to achieve step 302 of FIG. 3, for example. Though the example methods will be first described generally, method steps will be reference in later discussion of specific examples. The example methods may be carried out through execution of instructions on any type of computing device or devices. Although the example methods can be employed in connection with the particular devices of FIGS. 1 and 2, it will be appreciated that the methods may be employed in a variety of other settings.

Referring first to FIG. 4, an example method 400 for determining if two or more computing devices (e.g. computing system 10 and computing system 20) are proximate to each other is provided. For example, method 400 may be performed when two or more computing devices are connected to the same network.

Method 400 includes, at 402, broadcasting audio from a first computing device. At 404, the method includes receiving the broadcasted audio at a second computing device. At 406, the method includes processing the received audio to determine if the received audio does in fact correspond to the broadcasted audio. For example, processing may include identifying a unique audio signature within the broadcasted/received audio, said unique audio signature uniquely identifying the first computing device. At 408, the method includes determining, based on the broadcasted audio being received at the second computing device, that the first computing device and the second computing device are proximate to one another. At 410, the method includes providing a shared computing experience at one or both of the first computing device and the second computing device, wherein the shared computing experience is not provided in the event that it is determined that the first and second computing devices are not proximate to one another.

It will be appreciated that method 400 is provided by way of example and may include additional or alternative steps that those illustrated in FIG. 4. As one example, processing the received audio may include filtering out background ambient noise from a physical environment that the second computing device may have received while listening for the broadcasted audio. Therefore, the second computing device may determine if a portion of the received audio corresponds to the broadcasted audio, as other portions may be attributed to ambient background noise.

As another example, method 400 may include broadcasting a video signature from a first device and receiving the video signature at a second device. In such an example, a video capture device such as a camera (e.g., depth camera 32) may be configured to receive the video signature. Therefore, a depth camera may be enabled for motion capture and proximity determination. However, it will be appreciated that a depth camera is provided as one non-limiting example and other capture devices configured to receive a video signature are possible without departing from the scope of this disclosure.

As another example, upon determining that the first computing device and the second computing device are proximate to one another, the method may include retrieving data pertaining to prior interactions between the devices. For example, the first computing device and the second computing device may have interacted before, and thus, may have a historical record of prior interactions. As such, the shared computing experience may be controlled based on such data pertaining to the prior interactions.

In this way, two or more computing devices may determine if they are proximate to each other by broadcasting and receiving audio and/or video signatures. As indicated above, method 400 may be implemented by two or more computing devices that are communicatively linked to the same network, for example.

In some embodiments, two or more computing devices may be determined to be in the same general vicinity even though the computing devices are communicatively linked to different networks. For example, FIG. 5 illustrates a method 500 for determining if two or more computing devices are in close proximity via a cloud computing service. For example, determining whether a first computing device and a second computing device are proximate to on another may be implemented via a cloud computing service. As such, a second computing device may be communicating with the cloud computing service which uses a unique audio signature to identify a first computing device, for example.

Method 500 includes, at 502, detecting two or more computing devices within the same general vicinity via a cloud computing service. At 504, the method includes prompting a first computing device to enter a listening mode, where the cloud computing service is configured to prompt the listening mode. At 506, the method includes prompting a second computing device to enter a broadcasting mode, where the cloud computing service is configured to prompt the broadcasting mode. At 508, the method includes the first computing device identifying an audio and/or video broadcast emitted by the second computing device. At 510, the method includes determining that the first and second computing devices are proximate to one another.

It will be appreciated that method 500 is provided by way of example and may include additional or alternative steps that those illustrated in FIG. 5. As one example, method 500 may include one of the first or second computing devices prompting the other computing device to enter a listening mode via the cloud computing service. In this way, one computing device may initiate proximity determination by relaying the initiation through the cloud computing service and prompting another computing device to listen to a broadcast. As another example, method 500 may include, after determining if the first and second computing devices are proximate to one another, determining if the first and/or second computing devices are within a threshold distance from a main computing system. Such a threshold distance may be determined by a global positioning system, as described below.

For example, a computing device may be enabled to continuously or periodically transmit an invitation to share in order to initiate proximity determination. As another example, a computing device may be enabled to continuously or periodically receive an invitation to share in order to indicate proximity determination. As indicated above, method 500 may be implemented by a cloud computing service to manage communications between two or more computing devices in order to determine proximity between the computing devices when the two or more computing devices are communicatively linked to different networks (e.g., different LAN networks). It will be appreciated that either the cloud computing service or a computing device may be configured to initiate the listening and broadcasting modes to determine proximity. In some examples, more than one computing device may initiate a proximity determination protocol.

For example, a method 600 of determining proximity between two or more computing devices based upon detecting the same audio and/or video content emitted between the computing devices is provided in FIG. 6. Method 600 may be implemented at least in part by a cloud computing service to establish a shared experience when the two or more computing devices are determined to be in close proximity.

Method 600 includes, at 602, detecting audio and/or video content, where both a first computing device and a second computing device detect audio and/or video content. At 604, the method includes comparing the audio and/or video content detected by the first computing device to the audio and/or video content detected by the second computing device, where a cloud computing service is configured to compare. At 606, the method includes determining that the audio and/or video content detected by each device is the same. At 608, the method includes sending a message to the first computing device and the second computing device indicating that the computing devices are proximate. At 610, the method includes establishing a shared experience between the first and second computing devices. In this way, if the first and second computing devices are determined to be proximate, a shared computing experience between the first and second computing devices may be established. Else, the first and second computing devices may be inhibited from interacting via a shared computing experience.

It will be appreciated that method 600 is provided by way of example and may include additional or alternative steps that those illustrated in FIG. 6. Method 600 is provided as non-limiting example of two or more computing devices that may determine proximity to another based upon the computing devices outputting similar content. As indicated above, method 600 may be implemented by a cloud computing service at least in part to manage communications between two or more computing devices in order to determine proximity between the computing devices when the two or more computing devices are communicatively linked to different networks (e.g., different LAN networks).

Proximity determinations may also be made in connection with global positioning systems (GPS) or other similar systems. GPS may compare coordinates corresponding to a location of a first and second computing device to coordinates corresponding to a location of a main computing system, for example. GPS may determine a threshold distance between the first and second computing devices and the main computing system. If the location of the first or second computing device exceeds the threshold distance, the first or second computing device may be inhibited from joining a shared experience with the main computing system.

In another example, GPS coordinates may be used to determine that two devices are generally close to one another, with the final, more precise determination achieved using the acoustic methods discussed above, for example. For example, a GPS determination might identify that two devices are 20 feet apart, but even so would be unable to determine whether the devices are in the same room. In such a situation, the acoustic methods could improve upon the general proximity determined via GPS, specifically by refining the determination through acoustic broadcast and reception.

In another example, proximity determinations may be configured to employ GPS systems in order to exclude computing devices in locations greater than a threshold distance away from devices with an established shared experience. For example, a distant computing device may detect the same audio/visual content that was used to establish the shared experience between proximate computing devices. As an example, two mobile computing devices may establish a shared experience from audio/visual content detected from a gaming console executing a particular game. A distant computing device may detect the same audio/visual content from a different gaming console executing the same game. However, the distant computing device (and likewise the different gaming console) may exceed a predetermined threshold distance such that the distant computing device is too far away from the shared experience for a connection to the shared experience to be feasible.

However, it will be appreciated that a distant computing device that does not exceed the threshold distance may be invited to join the established shared experience, either automatically or by invitation from one of the computing devices in the established shared experience.

In some embodiments, audio and/or visual broadcasts may include a time stamp as data to manage shared experiences. For example, the time stamp may indicate a time in which the audio and/or visual content was broadcasted. Therefore, computing devices that detect the same audio and/or visual content within a threshold time window may be determined as proximate and thus may join a shared experience. In this way, computing devices that detect the audio and/or visual content at a time outside of the threshold time window may be excluded from the shared experience regardless of the proximity of the computing device to other computing devices with an established shared experience.

Further, computing devices that are deemed proximate but are located at varying distances from one another may join a shared experience via different routes. For example, some computing devices may join a shared experience by implementing method 400 while other computing devices may join the shared experience by implementing method 500 or 600. It will be appreciated that virtually any combination or subcombination of determining proximity between devices in order to establish a shared experience is possible without departing from the scope of this disclosure.

As introduced above, machine vision or other optical technologies may also be employed in order to broadcast and receive a video signature. For example, a motion capture system such as that shown in FIG. 2 may be part of a gaming console system, and may be used to identify the presence of a smartphone or other device in the same room as the console. For example, computing device 10 may be part of a gaming console system 50 and computing device 20 may be a smartphone 52. It should be further understood that the proximity determinations discussed herein, regardless of the particulars of how they are achieved, are typically performed automatically and without the need for any user input.

Proximity determination and device identification in the above methods may be performed using audio/acoustical and/or visual communications. For example, a first device may make an audio broadcast. A second device, if sufficiently close to the first device, may receive the audio broadcast. Thus, due to the mere fact of having "heard" the broadcast, it may be determined that the second device is proximate to the first device. As an alternative, a threshold strength or volume of the received audio may be used to establish that the devices are proximate to one another. From the audio exchange, inferences or calculations may also be employed to assess the distance between the two devices, and the proximity determination may be then be premised on the devices being within a threshold distance from each other.

It will be appreciated that audio received by the second device may be different than the audio broadcasted by the first device. For example, the second device may be in a location that has some ambient background noise. Therefore, the second device may hear the ambient background noise in addition to the audio broadcast from the first device.

Further, detecting and comparing background noise may be an indication as to whether or not two devices are proximate. For example, the first device may send out an audio broadcast that the second device may receive. As described above, the second device may hear the audio broadcast and background noise. The first device may also be configured to hear, and thus, may detect background noise. The first and second devices may communicate to determine if the two devices have heard the same background noise. In another example, a cloud computing service may be utilized to determine if the two devices detected the same or similar background noise. If the background noise is determined to be similar, then the two devices may be considered proximate. If the background noise is different, then the two devices may be considered remote. However, it will be appreciated that two or more devices may participate in a shared experience remotely. In such cases, the shared experience may be different as compared to a shared experience between proximate devices.

As an example, Jason and Megan wish to play a first-shooter video game with their respective computing devices. Jason's associated device may be a gaming console located within his living room, and as such, Jason's device may be considered a main computing device. As such, the main computing device may be the initiator for establishing a shared experience. While described in this example as a non-mobile gaming system (Jason's gaming console), it will be appreciated that a main computing device may be a mobile computing device. Megan may wish to play the game using her smartphone. Jason's device may broadcast audio as an invitation for proximate devices to participate in a shared experience. Megan may be sitting on a couch within Jason's living room and her smartphone may receive the audio broadcast. As such, the two devices may determine that they are proximate, as described above. Because the two devices are proximate, and depending on the capabilities of the two devices, Megan may aim her smartphone at a display associated with Jason's gaming console as a game control. For example, aiming the smartphone at the display may be interpreted as aiming a weapon at an enemy. Megan may touch a virtual element on a display of her smartphone to pull the trigger once she has determined that her smartphone is aimed and on target with the enemy displayed on Jason's device. In this way, Megan and Jason may participate in a proximate shared experience to play a first-shooter video game. In other words, the proximate shared experience may include more than one computing device, thus involving inter-device interaction. For example, inter-device interaction may be associated with the position and/or orientation of one device with respect to another device allowing one device to control aspects of another device. Such a shared computing experience that involves inter-device interaction may be enabled for a proximate shared experience; however, inter-device interaction may not be possible if the two devices are non-proximate even if the two devices are participating in a shared experience.

For example, Megan may be riding the bus home from work. Megan may receive, via her smartphone, an invitation to join Jason's gaming experience. Jason is at home hoping to begin a first-shooter game and wishes to share his experience with Megan even though they are remote from each other. Megan and Jason's devices may determine that they are non-proximate according to the methods as described above. As one example, Megan's device may listen for a broadcast and may receive audio comprising substantial background noise picked up from the bus. Megan's device may determine that it is non-proximate because although it received audio, the audio did not include a broadcast. However, Megan and Jason may still establish a remote shared experience, although the experience may not have the same capabilities as a proximate shared experience.

For example, in contrast to the example above, Megan's device may not be able to aim at a virtual enemy on a display associated with Jason's gaming console. Since Megan is on the bus and thus physically removed from Jason's living room, she is unable to position or orient her device with respect to Jason's gaming console such that it may directly interact with Jason's gaming console. Instead, Megan's device may be enabled to participate in the remote shared experience differently. For example, through touch interaction Megan's device may remotely communicate with Jason's device. A display of Megan's device may share at least some content with the display of Jason's device. To participate in the experience, Megan may swipe the screen of her smartphone to throw a grenade, for example. In this way, Megan and Jason may have a remote (i.e. non-proximate) shared experience that is different from a proximate shared experience. As described above, remote shared experiences and proximate shared experiences may vary due to the location, position, spatial orientation, and/or capabilities of the two or more devices participating in the shared experience (whether remote or proximate).

As indicated above, Jason's gaming console may be considered a main computing device because the gaming console initiated the shared experience by broadcasting audio to invite other devices to participate. However, it will also be appreciated that two devices may be actively broadcasting and listening simultaneously. In such cases, each device may communicate with a cloud computing service to report what they have broadcasted and what they have heard. In this example, the cloud computing service may compare the broadcasts and recordings of various devices that are reporting to the cloud computing service. As such, the cloud computing service may make a determination that two or more devices are proximate based on a comparison of reported broadcasts and recordings. For example, the cloud computing service may determine that two devices are proximate because they are reporting similar recordings that include similar background noise. Two devices may be located within the same café, for example, and the cloud computing service may recognize that the two devices are proximate. In addition, the cloud computing service may recognize that the two devices are executing the same video game, for example. As such, the cloud computing service may send a notification to each device to report that a proximate shared experience is possible, if desired.

In another example, the cloud computing service may compare broadcasts and recordings reported by two or more devices to determine that the two or more devices are remote. For example, the cloud computing service may include a comparison of background ambient noise received and reported by each device, and if the background ambient noise is substantially different beyond a threshold value, the cloud computing service may determine that the two or more devices are non-proximate.

Proximity, user/device identification, device capabilities, and/or spatial position/orientation may be employed and combined in nearly limitless ways to affect provision of a multi-device software experience. In one broad class of examples, the visual output at one or more of the interacting devices may change depending on whether or not the devices are proximate to one another. For example, in the case of three players, one of which is remote from the other two, the display output at the remote user's device may differ from that provided to the proximate users, and additionally may differ from what that user would see if she were in the same room with the other two players.

The broadcast and reception method may be performed in a nearly limitless number of ways to determine proximity and identify interacting devices. In one example, the broadcast includes a unique audio signature associated with the broadcasting device. The signature may be human perceivable or otherwise, for example at sub- or super-sonic levels that cannot be heard unaided by the human ear. For example, the signature may be implemented as watermark-type information extra-sonically embedded within an audio broadcast. In other words, a watermark may be embedded within an otherwise audible signal.

Typically, the signatures discussed herein are associated with particular devices, such that identification of the signature results uniquely in identification of the associated device.

Alternatively, a signature may be associated with other aspects of a device or its interaction with other devices. For example, a signature may be tied not only to a device, but also to a particular multi-user software application. For example, a given device might broadcast a signature that not only identifies the device, but that also specifies a particular software application. Accordingly, this can be interpreted at a receiving device as an invitation to participate in an interaction associated with a particular video game, for example.

In addition to or instead of the above examples, it should be understood that any number of other sonic communications may be employed to determine proximity and identify interacting devices.

In another example, assume that the system has identified that two devices are proximate to one another, and that the system has identified the users as "Bob" and "Alice." Imagine further that the system had stored history of interactions between Bob and Alice, with the history indicating that they generally interact using a particular game. Accordingly, upon determining proximity of Bob to Alice, the system could automatically start that particular game. The system could even be used to automatically resume a saved game that is in progress.

Continuing with the previous example, historical data associated with the respective computing devices of Bob and Alice may be used to provide a recommendation. For example, Bob and Alice may frequently play a particular game together, and the game may be used to determine and recommend similar games. As another example, the particular game may be linked to other players and the recommendation may be based upon games that other players have also enjoyed.

In another example, a particular game might have a single player mode and a multi-player mode. Upon detecting two or more users in proximity to one another, the game would automatically enter into multi-player mode. Carrying this example further, the system can use spatial position/orientation to configure the interaction. For example, if the system detects that one of the in-room devices is in a location where the user cannot see a main shared display, the system could infer that that user does not want to participate despite the fact that she is in proximity to the other users. For example, a proximate device may include a capture device and if the capture device is not aimed to capture visual content displayed by a main computing device, the spatial orientation may be inhibiting, such that the proximate device may be inhibited from controlling aspects of the main computing device. Therefore, the proximate device may be proximate but not involved with the shared computing experience.

In addition to or instead of this method, the orientation of a device could affect delivery of the shared experience. In particular, if a smartphone is pointed/aimed toward a large shared display, then it might be inferred that that user wishes to participate. Moreover, if a device is close to a main display (e.g., a smartphone close to a widescreen TV and a connected game console), it might be assumed that the smartphone, if it participates, will be used in a way analogous to a peripheral game controller. On the other hand, if the smartphone is further away or in a remote location, then the visual output at the display would be used to provide that user with a primary display experience, rather than just displaying user interface elements and controls that would be shown if the smartphone were being used as a gaming controller.

Proximity determinations can also be used to offer an opportunity to proximate users to start a game or other shared experience. For example, with a motion capture system (e.g., FIG. 2), the system may invite (e.g., through audio or video prompts) the users to affirm desire to participate by gesturing at the motion sensor. Yet another example is to activate/deactivate features depending on whether users are proximate. This can result in a change to one or more of the users, for example by showing different output at their various screens.

This disclosure describes many of the examples in a binary fashion, i.e., that a simple yes/no determination is made for proximity, with an accompanying consequence for the device interaction. It should be understood, however, that more granular proximity determinations may be made, for example by varying delivery of a software experience in response to automatic detection of distances between devices.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included herein are schematic and generally not drawn to scale. Rather, the various drawing scales, aspect ratios, and numbers of components shown in the figures may be purposely distorted to make certain features or relationships easier to see.

In some embodiments, the above described methods and processes may be tied to a computing system including one or more computers. In particular, the methods and processes described herein may be implemented as a computer application, computer service, computer API, computer library, and/or other computer program product.

As discussed above, FIGS. 1 and 2 schematically show non-limiting examples of a computing system that can carry out the proximity detection systems/methods discussed herein. Computing systems 10 and 20 are shown in simplified form. Although FIG. 2 shows a gaming-console and a smartphone as an example, it is to be understood that virtually any computer architecture may be used without departing from the scope of this disclosure. In different embodiments, the computing systems may take the form of a mainframe computer, server computer, desktop computer, laptop computer, tablet computer, home entertainment computer, network computing device, mobile computing device, mobile communication device, gaming device, etc.

As indicated in FIGS. 1 and 2, the example computing systems include a logic subsystem and a data-holding subsystem. The computing systems may also include a display subsystem, communication subsystem, and/or other components not shown in FIGS. 1 and 2. The computing systems may also optionally include user input devices such as keyboards, mice, game controllers, cameras, microphones, and/or touch screens, for example.

The logic subsystem may include one or more physical devices configured to execute one or more instructions. For example, the logic subsystem may be configured to execute one or more instructions (e.g., the described proximity detection instructions) that are part of one or more applications, services, programs, routines, libraries, objects, components, data structures, or other logical constructs. Such instructions may be implemented to perform a task, implement a data type, transform the state of one or more devices, or otherwise arrive at a desired result.

As described above, the instructions may be configured to broadcast audio and/or video, receive the broadcast, process the received broadcast, identify a unique signature within the broadcast, identify a computing device associated with the unique signature, determining proximity to the computing device, and providing a shared computing experience if proximity with the computing device is determined. In this way, two or more computing device may determine their proximity to one another in order to automatically link the devices and provide a shared user experience.

The logic subsystem may include one or more processors configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

The data-holding subsystem may include one or more physical, non-transitory, devices holding data and/or instructions executable by the logic subsystem to implement the herein described methods and processes. For example, data and/or instructions may be executable by the logic subsystem to detect an audio signature, and identify a computing device associated with the audio signature. Further, the instructions may include establishing a communicative link with the computing device to thereby form a shared computing experience. Thus, the computing device may be configured for an interactive software experience, wherein configuring includes determining a user associated with the linked computing device and identifying historical data associated with the user, the historical data influencing the shared computing experience, for example. It will be appreciated that when such methods and processes are implemented, the state of the data-holding subsystem may be transformed (e.g., to hold different data).

The data-holding subsystem may include removable media and/or built-in devices. The data-holding subsystem may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystem may include devices with one or more of the following characteristics: volatile, nonvolatile, dynamic, static, read/write, read-only, random access, sequential access, location addressable, file addressable, and content addressable. In some embodiments, the logic subsystem and the data-holding subsystem may be integrated into one or more common devices, such as an application specific integrated circuit or a system on a chip.

The data-holding subsystem may include removable computer-readable storage media, which may be used to store and/or transfer data and/or instructions executable to implement the herein described methods and processes. The removable computer-readable storage media may take the form of CDs, DVDs, HD-DVDs, Blu-Ray Discs, EEPROMs, and/or floppy disks, among others.

It is to be appreciated that the data-holding subsystem includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of the computing system that is implemented to perform one or more particular functions. In some cases, such a module, program, or engine may be instantiated via a logic subsystem executing instructions held by a data-holding subsystem (e.g., instructions 18 and 28 respectively stored by data-holding subsystems 16 and 26 of FIGS. 1 and 2). It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, a display subsystem may be used to present a visual representation of data held by the data-holding subsystem. As the herein described methods and processes change the data held by the data-holding subsystem, and thus transform the state of the data-holding subsystem, the state of the display subsystem may likewise be transformed to visually represent changes in the underlying data. The display subsystem may include one or more display devices utilizing virtually any type of technology. Such display devices may be combined with the logic subsystem and/or the data-holding subsystem in a shared enclosure, or such display devices may be peripheral display devices.

In some embodiments, computing devices in an established shared experience may include a display that serves as a peripheral display. For example, a user may desire to use their mobile device as a peripheral to the main system. In this way, much of the screen real estate may be devoted to a user interface of the main system display and controls may be provided within a user interface of the linked mobile device display, for example. As such, most of the main system display may be provided as a primary visual display to output.

When included, a communication subsystem may be configured to communicatively couple the computing system with one or more other computing devices. The communication subsystem may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some embodiments, the communication subsystem may allow the computing system to send and/or receive messages to and/or from other devices via a network such as the Internet.

In some embodiments, the computing system may include a capture device, such as a depth camera (e.g., depth camera 34). As discussed above, the depth camera may be configured to capture a visual broadcast. However it will be appreciated that in addition to or instead of a depth camera, virtually any motion-sensing technology may be employed in connection with the interacting computing systems of FIG. 1.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of using device proximity to provide a shared computing experience, comprising:
   receiving, at a receiving computing device, received audio broadcast from a broadcasting computing device as a broadcast invitation;
   joining a shared computing experience that provides for inter-device interaction via a non-audio communicative link with the broadcast computing device in response to verifying the broadcast invitation based on a spatial orientation of the receiving computing device relative to the broadcasting computing device, where the shared computing experience is not joined if the broadcast invitation is not verified and where the non-audio communicative link is established via at least one of a wired network connection and a Wi-Fi connection;
   retrieving historical data pertaining to prior interactions between the broadcasting computing device and the receiving computing device during the shared computing experience; and
   controlling the shared computing experience based on the historical data pertaining to the prior interactions.

2. The method of claim 1, where the received audio includes an audio signature.

3. The method of claim 2, where the audio signature is not human perceivable and is embedded within an otherwise audible signal.

4. The method of claim 3, where the audio signature is watermark embedded within the otherwise audible signal.

5. The method of claim 2, where the audio signature is human perceivable.

6. A method of using device proximity to provide a shared computing experience, comprising:
broadcasting an audio signal as a broadcast invitation;
if a broadcasting computing device and a receiving computing device are proximate as verified by the receiving computing device's reception of the broadcast invitation, joining a shared computing experience between the broadcasting computing device and the receiving computing device that provides for inter-device interaction via a non-audio communicative link and based on a spatial orientation of the receiving computing device relative to the broadcasting computing device, where the shared computing experience is not joined if no response to the broadcast invitation is received, where the non-audio communicative link is established via at least one of a wired network connection and a Wi-Fi connection;
retrieving historical data pertaining to prior interactions between the broadcasting computing device and the receiving computing device during the shared computing experience; and
controlling the shared computing experience based on the historical data pertaining to the prior interactions.

7. The method of claim 6, wherein the broadcast invitation includes video content.

8. The method of claim 6, wherein the broadcasting computing device is communicatively linked to the receiving computing device over the same local area network.

9. The method of claim 6, wherein the broadcasting computing device is communicatively linked to the receiving computing device over different local area networks.

10. The method of claim 9, wherein a listening mode of the receiving computing device is prompted by a cloud computing service acting as a manager and communicatively linked to the receiving computing device.

11. The method of claim 6, wherein an estimated distance between the broadcast computing device and the receiving computing device is at least in part estimated using a global positioning system such that coordinates corresponding to a location of the receiving computing device and the broadcasting computing device are compared relative to each other.

12. The method of claim 11, wherein if the estimated distance between the receiving computing device and the broadcasting computing device exceeds a threshold distance, inhibiting the receiving computing device from joining the shared computing experience.

13. A computing device comprising a logic subsystem and a data-holding subsystem holding instructions executable by the logic subsystem to:

detect a broadcast invitation including an audio signature from a broadcasting computing device;
identify the broadcasting computing device associated with the audio signature;
in response to identifying the broadcast computing device, join a communicative link with the broadcasting computing device based on a spatial orientation of the receiving computing device relative to the broadcasting computing device to thereby form a shared computing experience including the broadcasting computing device;
configure the shared computing experience as an interactive software experience that provides for inter-device interaction via a non-audio communicative link, where the non-audio communicative link is established via at least one of a wired network connection and a Wi-Fi connection;
retrieve historical data pertaining to prior interactions between the broadcasting computing device and the receiving computing device during the shared computing experience; and
control the shared computing experience based on the historical data pertaining to the prior interactions.

14. The method of claim 1, further comprising estimating a distance between the receiving computing device and the broadcasting computing device based on one or more parameters of the received audio, and joining the shared computing experience only if the distance is below a threshold distance.

15. The method of claim 14, where the distance is estimated based on a perceived volume of the received audio.

16. The method of claim 6, wherein a distance between the receiving computing device and the broadcasting computing device is estimated based on one or more parameters of received audio verified by the receiving computing device's reception of the broadcast invitation.

17. The method of claim 6, where broadcasting the broadcast invitation is initiated by a cloud computing service communicatively linked to the broadcasting computing device.

18. The method of claim 17, where the cloud computing service initiates the broadcasting after comparing background noise at the broadcasting computing device to background noise at a receiving computing device and determining that the broadcasting computing device and the receiving computing device are proximity candidates.

19. The method of claim 1, where joining the shared computing experience is based on capabilities of the receiving computing device and the broadcasting computing device.

* * * * *